(12) United States Patent
Brueckner et al.

(10) Patent No.: US 7,564,845 B2
(45) Date of Patent: Jul. 21, 2009

(54) METHOD FOR PERMANENT REDUNDANT TRANSMISSION OF DATA MESSAGES IN COMMUNICATION SYSTEMS

(75) Inventors: Dieter Brueckner, Unterleiterbach (DE); Dieter Klotz, Fuerth (DE); Karl-Heinz Krause, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 535 days.

(21) Appl. No.: 11/082,962

(22) Filed: Mar. 18, 2005

(65) Prior Publication Data

US 2006/0007852 A1    Jan. 12, 2006

Related U.S. Application Data

(63) Continuation of application No. PCT/DE03/002958, filed on Sep. 5, 2003.

(30) Foreign Application Priority Data

Sep. 18, 2002   (DE) ............................. 102 43 384

(51) Int. Cl.
*H04L 12/28* (2006.01)

(52) U.S. Cl. .................. 370/390; 370/216; 370/218; 370/225; 370/256; 709/238; 709/239; 714/4; 714/43

(58) Field of Classification Search ................. 370/216, 370/218, 225, 256, 390; 709/238, 239; 714/4, 714/43
See application file for complete search history.

(56) References Cited

U.S. PATENT DOCUMENTS

| | | | |
|---|---|---|---|
| 5,859,959 A | 1/1999 | Kimball et al. | |
| 6,081,511 A | 6/2000 | Carr et al. | |
| 6,097,696 A * | 8/2000 | Doverspike | 370/216 |
| 6,407,985 B1 * | 6/2002 | Jain | 370/256 |
| 6,408,000 B1 * | 6/2002 | Lamberg et al. | 370/390 |
| 6,598,088 B1 * | 7/2003 | Lynch et al. | 709/238 |
| 6,873,618 B1 * | 3/2005 | Weaver | 370/390 |
| 6,981,174 B1 * | 12/2005 | Hanning | 714/5 |
| 7,085,224 B1 * | 8/2006 | Oran | 370/216 |
| 7,154,866 B2 * | 12/2006 | Shurmantine et al. | 370/279 |
| 2002/0012317 A1 | 1/2002 | Sakamoto et al. | |
| 2002/0064157 A1 | 5/2002 | Krause | |
| 2002/0116669 A1 | 8/2002 | Jain | |
| 2003/0026202 A1 * | 2/2003 | Aschermann | 370/216 |

FOREIGN PATENT DOCUMENTS

| | | |
|---|---|---|
| DE | 100 58 524 A1 | 6/2002 |
| EP | 0 981 226 A1 | 2/2000 |
| EP | 1 168 714 A2 | 1/2002 |
| EP | 1657888 A1 * | 5/2006 |
| WO | WO 02/43336 A1 | 5/2002 |

* cited by examiner

*Primary Examiner*—Ricky Ngo
*Assistant Examiner*—Luat Phung
(74) *Attorney, Agent, or Firm*—Sughrue Mion, PLLC

(57) ABSTRACT

The method carrying out permanent redundant transmission of data messages in disjunctive paths, such that circulating data messages can be reliably identified and destroyed. The method includes splitting a redundant message into two data messages in the respective branching point in a transparent manner. The method further includes causing no additional load for the receiver of the two identical messages by, for instance, allocating a current cycle number to the received data message in a cyclic communication system (26). This can also be ensured in a non-cyclic communication system by means of software processing, for instance, by processing the header identifier of the data messages. In particular, the behavior of the communication system (26) with respect to "learning" the addresses in the individual users (1, 2, 3, 4, 5), more particularly the switches, is not altered for the remaining non-redundant data traffic.

40 Claims, 6 Drawing Sheets

| | |
|---|---|
| 1-5. | Users |
| 6. | Local Interface of User 1 |
| 7, 23. | Non-Redundant Data Traffic Ports of User 1 |
| 8. | Redundant Data Traffic Port of User 1 |
| 9, 13, 16, 21, 24. | Network Connections |
| 10. | Non-Redundant Data Traffic Port of User 2 |
| 11, 12. | Redundant Data Traffic Ports of User 2 |
| 14, 15. | Redundant Data Traffic Ports of User 4 |
| 17. | Logic Split |
| 18. | Redundant Network Path |
| 19. | Redundant Data Traffic Port of User 3 |
| 20. | Non-Redundant Data Traffic Port of User 3 |
| 22. | Non-Redundant Data Traffic Port of User |
| 25. | Non-Redundant Data Traffic Port of User 5 |
| 26. | Communication System |
| 27. | Address Table of User 1 |

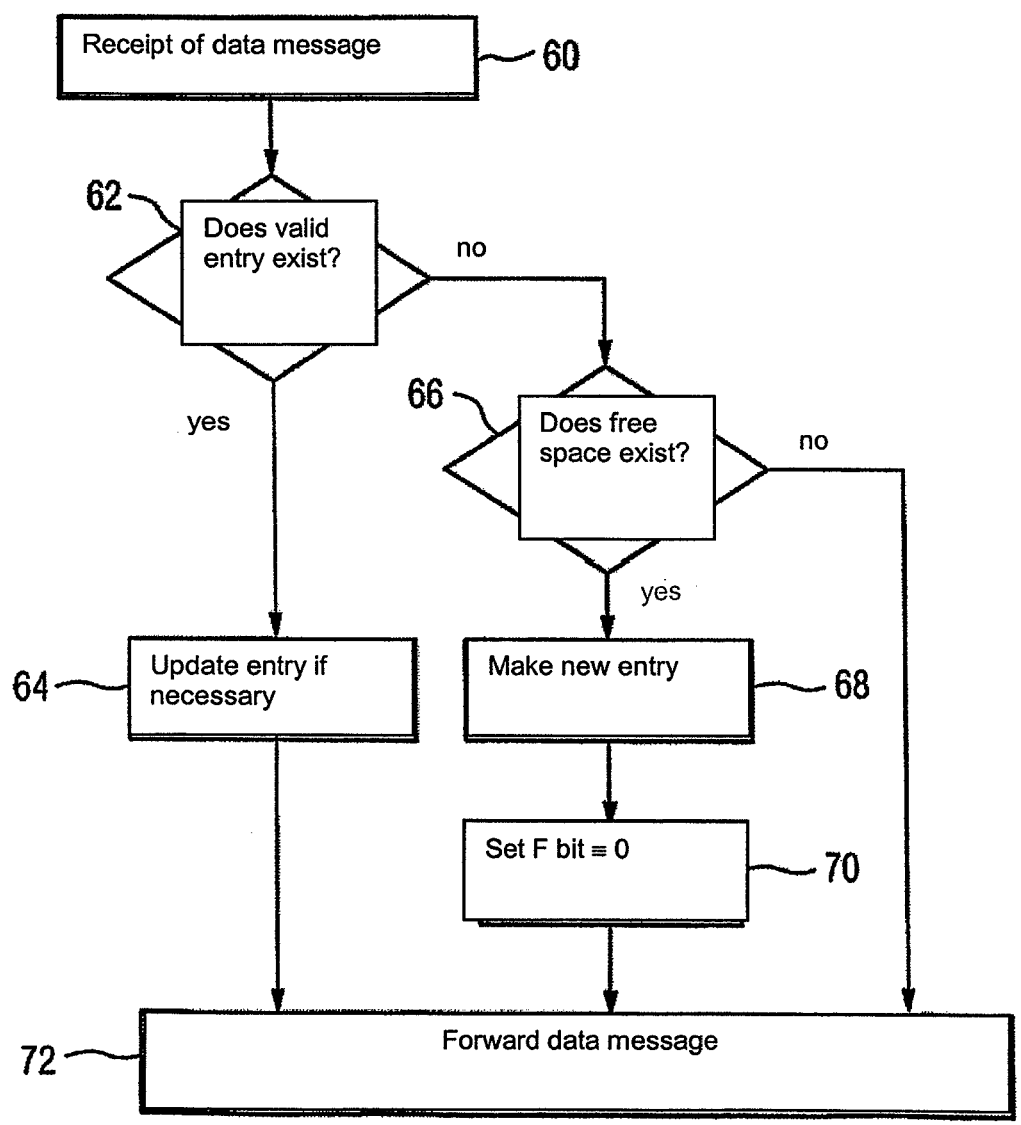

FIG 5

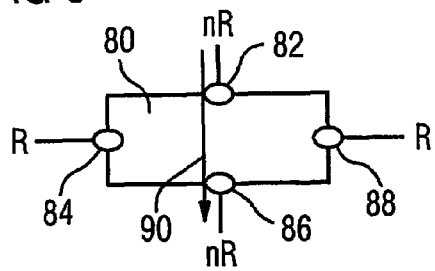

| 80. | User |
|---|---|
| 82, 86. | Non-Redundant Data Traffic Ports |
| 84, 88. | Redundant Data Traffic Ports |
| 90. | R Message |

FIG 6

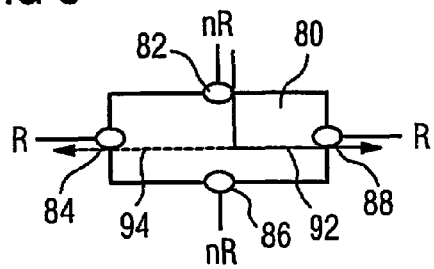

| 80. | User |
|---|---|
| 82, 86. | Non-Redundant Data Traffic Ports |
| 84, 88. | Redundant Data Traffic Ports |
| 92. | R Message |
| 94. | Duplicate copy of the R Message |

FIG 7

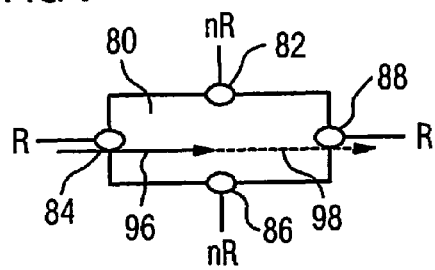

| 80. | User |
|---|---|
| 82, 86. | Non-Redundant Data Traffic Ports |
| 84, 88. | Redundant Data Traffic Ports |
| 96. | R Message |
| 98. | R Message being Forwarded |

FIG 8

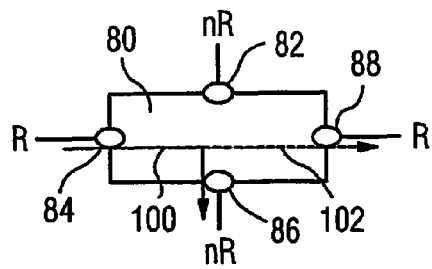

| 80. | User |
|---|---|
| 82, 86. | Non-Redundant Data Traffic Ports |
| 84, 88. | Redundant Data Traffic Ports |
| 100. | R Message |
| 102. | R Message being Forwarded |

1-5. Users
6. Local Interface of User 1
7, 23. Non-Redundant Data Traffic Ports of User 1
8 Redundant Data Traffic Port of User 1
9, 13, 16, 21, 24. Network Connections 10. Non-Redundant Data Traffic Port of User 2
11, 12. Redundant Data Traffic Ports of User 2
14, 15. Redundant Data Traffic Ports of User 4
17. Logic Split
18. Redundant Network Path

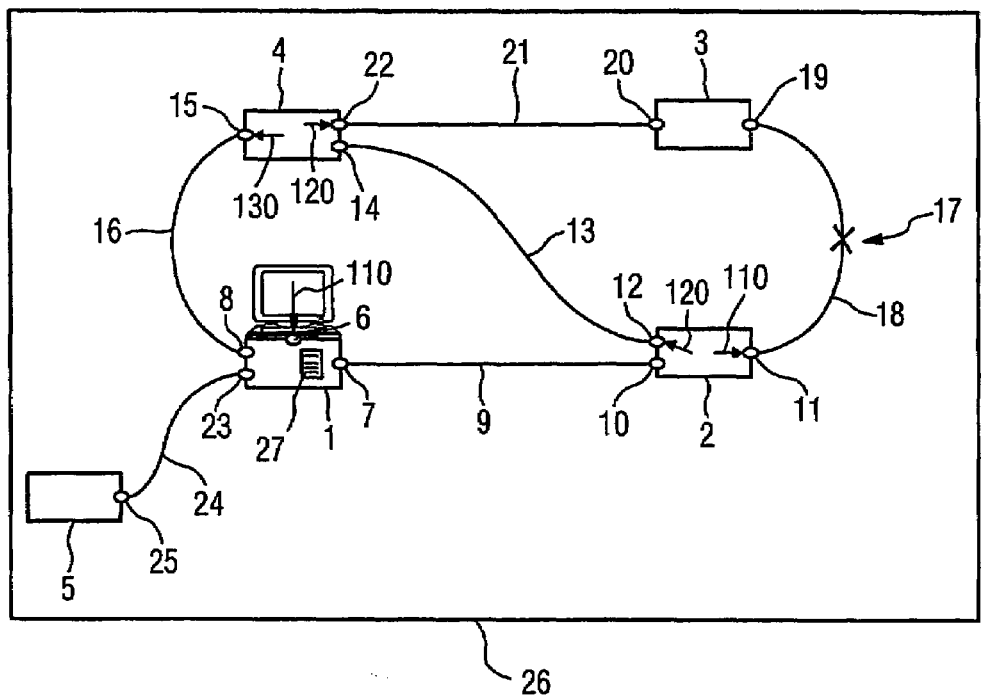

FIG 9

19. Redundant Data Traffic Port of User 3
20. Non-Redundant Data Traffic Port of User 3
22. Non-Redundant Data Traffic Port of User 4
25. Non-Redundant Data Traffic Port of User 5
26. Communication System
27. Address Table of User 1
110. R Message
120, 130. Duplicate R Messages

METHOD FOR PERMANENT REDUNDANT TRANSMISSION OF DATA MESSAGES IN COMMUNICATION SYSTEMS

This is a Continuation of International Application PCT/DE2003/002958, with an international filing date of Sep. 5, 2003, which was published under PCT Article 21(2) in German, and the disclosure of which is incorporated into this application by reference.

FIELD OF AND BACKGROUND OF THE INVENTION

1. Field of the Invention

The present invention relates to a method for permanent redundant transmission of data messages in communication systems. The present invention further relates to a communication system for permanent transmission of data messages and to a user of such a communication system.

2. Description of Related Art

A communication system is a system with a plurality of users, which are interconnected by network connections for the mutual exchange of data or the mutual transmission of data. The data to be transmitted are dispatched as data messages. The data may be combined into one or more packets, and in this combined form are sent over the network connections to the respective receiver. Hence, this combined form of data is sometimes termed "data packets." The term "transmission of data" as used hereinafter is synonymous with the above-described transmission of data messages or data packets.

Users of a communication system are, for example, central automation devices, programming, configuration and operator units, peripheral devices such as, for example, input/output modules, drives, actuators, sensors, stored program controllers (SPCs) or other control units, computers or machines that exchange electronic data with other machines, and in particular, process data of other machines. Users are also referred to as network nodes or nodes.

The term "control units", as used hereinafter, refers not only to open and closed-loop control units of all types but also to, for example, coupling nodes (switches) and/or switch controllers. For example, switched Ethernets, industrial Ethernets and particularly, isochronous Real-Time Ethernets are used as communication systems or data networks.

Communication systems with transfer rates ≧100 MB/s are usually switched high-performance data networks and are made up of individual point-to-point connections with so-called active nodes or coupling nodes, also referred to as switches, which are switched between the separate users. As a rule, each coupling node has a plurality of ports. Each coupling node can be connected to a number of users depending on the number of ports. A switch may itself be a user.

These coupling nodes or switches are currently separate devices. These coupling nodes, however, are increasingly integrated directly into the connected devices or users. Such a cost-effective integration of the switches or the switch functionality into the individual users or automation devices is made possible by VLSI technology (Very Large Scale Integration technology). Thus, with suitable cabling, communication systems can have substantially larger dimensions because only user-to-user connections are employed.

In these communication systems with a very large number of users, particularly in linear arrangements, the active node or switch is a potential source of problems. If a user fails, the entire line fails. In addition, if an additional user is inserted, the communication system must be briefly interrupted. Closing the line into a ring with a redundant path would be desirable.

If the communication system is designed in a ring, in the event of a fault in a network connection, for example during an interruption or the failure of a user, the data traffic could alternatively be routed through the remaining network connections. However, in automatic destination finding and/or broadcast/multicast addressing such redundant paths lead to circulating data messages. To prevent these continuously circulating data messages, when a communication system is started up, a check for possible circularities is performed, and the communication system is logically interrupted at a suitable location. That is, although the communication system is connected in a ring, a suitable location for a stop point is created. The redundant path is used only in the standby mode. In other words, in the event of faults, the system switches to the backup paths within the context of a reconfiguration. However, the outage caused by this reconfiguration cannot be tolerated in many automation applications.

A method for the identification of circularities in a communication system is known or prescribed by the IEEE 802.1Q standard. This method is also called the "spanning tree" or the "fast spanning tree" method. The simpler the topology of a communication system or the smaller the communication system, the faster a fault is detected, and the communication system is dynamically reconfigured. This reconfiguration again includes a check for circularities within the communication network and depending on the topology and size of the network may last into the double-digit seconds range. For a ring-type communication system, a dynamic reconfiguration time of less than 1 second is possible if special methods are used. Durations of this magnitude are currently acceptable in the fields of application of communication networks of this type.

With the current methods, however, when faults occur, completely bumpless or transparent switching over time is not possible. To ensure bumpless and transparent switching, data messages must be permanently redundantly transmitted on disjunctive network paths. Such a permanent use of redundant network paths is possible if the full path information of a data message transfer is stored in advance in all users involved in the communication system. Such a method is known, in particular, for isochronous Real-Time Ethernet communication from DE 10058524.8. In contrast, in data communication with independent path search, that is, in an address-based data communication, similar solutions are not known.

OBJECTS OF THE INVENTION

One object of the present invention is to provide a method, a communication system, and a user of this communication system, which enable a permanent redundant transmission of data messages for an address-based data transmission.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an exemplary, non-limiting formulation of the present invention, a method for injecting and/or receiving and/or forwarding data messages in a communication system, particularly for real-time communication, with a plurality of users which are interconnected by network paths, is provided. Each user of this method is configured as a sender and/or receiver of data messages and has a unique address, at least one first and one second port for receiving and/or forwarding data messages, and at least one additional port for injecting and/or receiving and/or forwarding data messages designated for redundant forwarding. In addition, each user has an address table for storing at least one send address of an injected data message. The communication system has at least one network path with a logic interruption.

The method includes identifying data messages designated for redundant forwarding, injecting the data messages designated for redundant forwarding into the communication system at one of the additional ports of a user. The method further includes if the data message is received through the first or the second port and forwarded through an additional port of the user, or if the data message is received through an additional port and forwarded through the first or second port of the user, duplicating one of the data messages designated for redundant forwarding in a user.

The method further includes forwarding a duplicate data message through the first port of the user if a data message designated for redundant forwarding is received or forwarded through the second port of the user, or forwarding of a duplicate data message through the second port of the user if a data message designated for redundant forwarding is received or forwarded through the first port of the user.

According to yet another exemplary, non-limiting formulation of the present invention, a user for a communication system is configured as at least one of a sender and a receiver of data messages. The user is provided with: a unique address, at least one first and one second port for performing at least one of receiving and forwarding data messages designated as non-redundant, at least one additional port for performing at least one of injecting, receiving, and forwarding data messages designated for redundant forwarding, and an address table for storing at least one send address of an injected data message.

The user includes a module identifying data messages designated for redundant forwarding, module injecting the data messages designated for redundant forwarding into the communication system at one of the additional ports, module duplicating one of the data messages designated for redundant forwarding if the data message is received through the first or the second port and forwarded through an additional port, or if the data message is received through an additional port and forwarded through the first or the second port, and module forwarding a duplicate data message through the first port if a data message designated for redundant forwarding is received or forwarded through the second port, and module forwarding a duplicate data message through the second port if a data message designated for redundant forwarding is received or forwarded through the first port.

Finally, according to another exemplary, non-limiting formulation of the present invention, a communication system having a plurality of the users described above is provided Some of the exemplary refinements of the formulations are described below.

Preferably, data messages designated for redundant forwarding are identified by a unique header identifier. Furthermore, in a communication system according to the exemplary formulations, network paths with a logic interruption are used only by data messages identified as designated for redundant forwarding. The data message type introduced by such an identifier in the header of a data message ignores the logic splitting of such network paths, which cannot be used for data messages with no or with a different identifier. All data messages which contain important or critical, particularly time-critical data, and therefore must reach their receiver may be provided with such an identifier. The identification of such messages, which may also be referred to as R data messages, is possible either by hardware or software means. Thus, the data traffic on such a so-called redundant network path, i.e., a network path with a logic interruption, is advantageously reserved exclusively for data messages with critical or otherwise important data.

According to a further illustrative refinement of the formulations of the present invention, if a data message identified as designated for redundant forwarding is injected into the communication system at one of the additional ports of a user, the send address of the user which injects the data message into the communication system and an additional marking are entered into the address table of the injecting user. Data messages are always injected into the communication system through one of the additional ports of a user. That is, through one of the ports potentially designated for the forwarding of non-redundant data traffic.

In contrast, the first and the second port of a user are, in principle, designated for the forwarding of redundant data traffic and are identified accordingly for the switch. In other words, each user has two ports designated for the forwarding of redundant data traffic. All other ports of the user are, in principle, not designated for the forwarding of redundant data traffic. This means that the network paths in a communication system with a logic interruption are connected to a port of a user designated for the forwarding of redundant data traffic at both ends of the network path, since only data messages identified as designated for redundant forwarding can use these network paths. It further means that network paths that connect two ports designated for the transmission of redundant data traffic can be logically split if necessary. Otherwise, subject to the above-described boundary conditions, both data messages not designated for redundant forwarding and data messages designated for redundant forwarding can in principle use all the ports of the respective users.

In particular, any type of data messages, that is, both data messages designated for redundant forwarding and data messages not designated for redundant forwarding are injected into the communication system through one of the additional ports of a user. Entering the send address of the injecting user and an additional marking into the respective address table of the injecting user ensures that circulating messages are reliably detected. This makes it possible to subsequently destroy such circulating messages, and thereby to avoid detrimental overloading of the network paths.

Preferably, the additional marking consists of one bit, which can assume two values, 0 or 1. The entering of the additional marking, such as the setting of the respective bit, which is also referred to as the filter bit or F bit for short, may consist of setting the F bit to the value 1 or, if the F bit is normally pre-assigned the value 1, then setting the F bit to the value 0. If an additional marking exists in the address table of the associated user, that is, if the F bit is set, then this means that the respective user is the injecting user.

According to another variation of the exemplary formulation of the present invention, if a data message identified as designated for redundant forwarding is received at one of the additional ports of a user, a check is performed to establish whether the address table of the receiving user contains an entry with the send address of the user that injected the data message into the communication system and an additional marking.

If no such entry exists, the send address of the user that injected the data message into the communication system and/or an additional marking are entered into the address table of the receiving user and the respective data message is forwarded. On the other hand, if such an entry exists, the respective data message is forwarded.

In other words, if a data message identified as designated for redundant forwarding is received, a check is performed to establish whether the send address of the user that injected the data message into the communication system is entered in the address table. If the receive port is designated for redundant forwarding, the F bit is also checked. If the send address of the data message is entered in the address table, the F bit is set, and the receive port is designated for redundant forwarding, then the data message is a circulating message and is not forwarded. The send addresses of messages that are received at such redundant ports are not "learned." That is, these send addresses and the receive port are not entered into the address table.

If, on the other hand, the receive port is not designated for redundant transmission and a message designated for redundant transmission is injected into the redundant communication system at this receive port, then only the send address of this message is entered into the address table and the F bit is set; thereby, identifying the injection point or the injecting user. Furthermore, in this case, the address table of the respective user is not altered to "learn" the addresses for the regular non-redundant data traffic.

In a preferable variation of the exemplary formulation, "learning" means that when a data message is received both the address of the sender and the port through which the data message was received are entered into the address table of the receiving user. Thus, data messages that are to be transmitted to the respective sender can be specifically forwarded. "Learning," in other words, also means learning the relationship between the send address of the user that injected the data message into the communication system and the port through which the data message was received in the respective user.

No "learning," on the other hand, means that if a data message identified as designated for redundant forwarding is received, the respective port through which the respective data message was received is not entered, as is the case for all the other data messages.

This exemplary method ensures that a data message injected into a redundant communication system can subsequently be clearly identified, and therefore, filtered if it is received again at a redundant receive port of the injecting user or node.

According to yet another illustrative, non-limiting variation of the exemplary formulations of the present invention, if a data message identified as designated for redundant forwarding and/or a duplicate data message are received through the first or the second port of a user, a check is performed to find out whether the address table of the receiving user contains an entry with the send address of the user that injected the respective data message into the communication system and an additional marking. The respective data message and/or the duplicate data message are destroyed, if such an entry is discovered, or the respective data message and/or the duplicate data message are forwarded if such entry is not found, e.g., send address does not exist in the address table or if the send address exists without additional marking.

If a data message identified as designated for redundant forwarding are received through the first or the second port of a user, that is, through one of the two ports of a user that are potentially designated for the forwarding of redundant data traffic, circulating data messages are identified by checking the entries and the additional markings in the respective address table of the receiving user and are destroyed so that they are eliminated from and no longer circulate in the communication system.

On the other hand, in the absence of such an entry, the respective data message is simply forwarded and a respective "learning," as provided for the other data messages, does not take place. The same may also be true for the duplicates of data messages identified as designated for redundant forwarding. Here, the additional marking has already occurred, for example, through the setting of the aforementioned filter bit.

According to a further illustrative refinement of the formulation of the present invention, the communication system operates cyclically. That is, data transmission occurs in specific communication cycles having a specific duration, for example. A data message, particularly a data message identified as designated for redundant forwarding, is assigned a current cycle number and a frame ID when it is injected into the communication system. The cycle number identifies the current communication cycle of the communication system and indicates whether the data of a data message is obsolete or current.

According to a further refinement of the formulation of the present invention, the receiver of a data message, particularly a data message identified as designated for redundant forwarding, stores both the current cycle number and the frame ID of the received data message. Furthermore, the receiver of a data message, particularly, of a data message identified as designated for redundant forwarding, compares the cycle number of the received data message and the current cycle number stored in the receiver as the data message is received. If the frame ID is the same, the receiver accepts the data of the received data message if the two compared cycle numbers match, or ignores the data of the received data message and/or destroys the data message if the two compared cycle numbers do not match. The receiver of such a data message thus has the means and the information, on the one hand, to distinguish current data messages from obsolete data messages and, on the other hand, to accept the respective information or data of current data messages, or, if updating has already occurred, to discard or destroy obsolete data or data messages.

The splitting of a data message identified as designated for redundant forwarding into two messages can thus be effected transparently in the branching point and causes no additional load for the receiver as a result of the receipt of two messages, provided this is respectively supported by the hardware. For a cyclically operating communication system this check can be hardware supported. It may also be software-supported, but in this case, the messages would always have to be received. Software-supported identification of current or obsolete data messages is also possible and conceivable in non-cyclic communication systems. Software-supported processing of the two redundant data messages in the receiver can be effected, for example, through the header identifier of the data messages and can therefore be used in any manner.

It is furthermore particularly advantageous that the disclosed methods are applicable in automation systems, particularly in packing machines, presses, plastic injection machines, textile machines, printing machines, machine tools, robots, handling systems, wood processing machines, glass processing machines, ceramic processing machines and lifting devices.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements, in which:

FIG. 4 is a flow diagram of a method for receiving data messages not designated for redundant forwarding at any receive port according to the exemplary embodiment of the present invention, FIGS. 5, 6, 7, and 8 are block diagrams illustrating possible scenarios when data messages identified as designated for redundant forwarding are transmitted, forwarded, or duplicated according to an exemplary, non-limiting embodiment of the present invention, and FIG. 9 is a block diagram illustrating a method for the communication system according to an illustrative, non-limiting embodiment of the present invention.

DETAILED DESCRIPTION OF ILLUSTRATIVE, NON-LIMITING EMBODIMENTS

Figure 1:
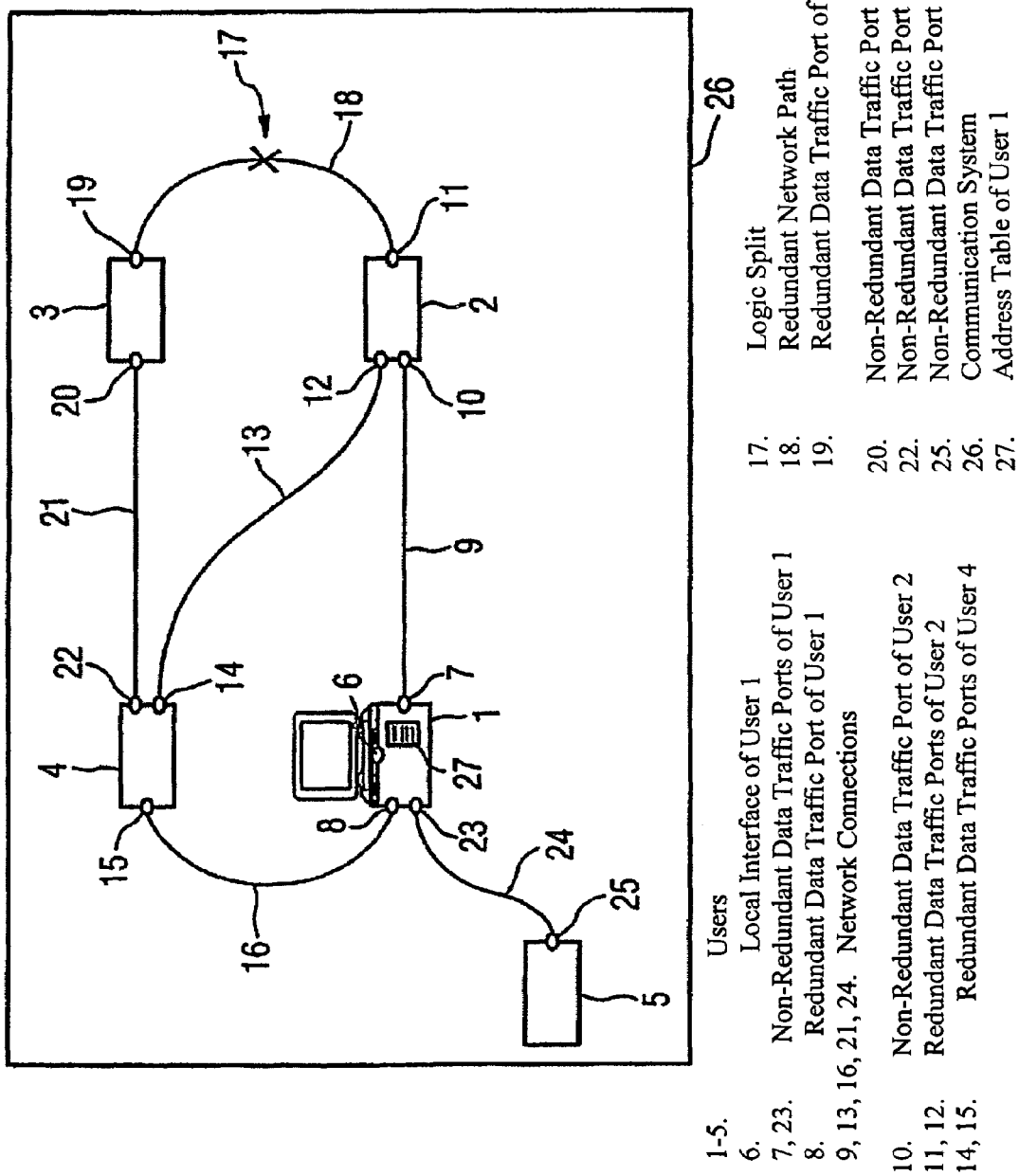
FIG. 1 is a block diagram of a communication system according to an exemplary, non-limiting embodiment of the present invention.

FIG. 1 illustrates a block diagram of a communication system 26 according to an exemplary non-limiting embodiment of the present invention. The depicted communication system 26 represents, for example, a distributed real-time critical automation system. This communication system 26 is also a switch communication network, for example, a Real-Time Ethernet system. This communication system 26 is a cyclically working system. In other words, data transmissions occur in one or more transmission cycles.

The depicted communication system 26 has a number of users 1, 2, 3, 4, and 5, which are configured as both senders and receivers of data messages. The users 1, 2, 3, 4, and 5 may be configured, for example, as computers, other automation devices such as drives, or as separate coupling units, i.e., switches, preferably Real-time Ethernet switches. Each of the users 1, 2, 3, 4, 5 of the communication system 26, however, may also have a coupling unit integrated into the respective user, particularly a Real-time Ethernet switch, as illustrated by way of example for the user 1. The remaining integrated switches for users 2-5 are not shown for reasons of clarity. The switches are used to inject, receive, and/or forward the data messages to be transmitted, particularly, the data messages designated for redundant forwarding. The users 1, 3, 2, 4, 5 are also referred to as network nodes.

Each of the users 1, 2, 3, 4, 5 of the communication system 26 has an address table. For reasons of clarity, only user 1 is depicted with an address table 27. Each of the users 1, 2, 3, 4, 5 further has a number of ports. For each user 1, 2, 3, 4, and 5, two of the ports may be provided for redundant data traffic. All other ports of the respective user are potentially provided for non-redundant data traffic. For reasons of clarity, not all ports of each of the users 1, 2, 3, 4, 5 are depicted.

For example, in FIG. 1, the user 1 is depicted with the port 8, which is provided for redundant data traffic and the ports 7 and 23, which are provided for non-redundant data traffic. User 1, in particular, represents a network node, for example, an automation device with an integrated switch. That is, user 1 has a local interface 6 as depicted in FIG. 1. A local interface, particularly the local interface 6, is one of the additional ports of a user, which is potentially provided for non-redundant data traffic. That is, a local interface is provided for injection of data of its respective user.

In the exemplary communication system depicted in FIG. 1, user 2 has three ports. In particular, user 2 has port 10, which is provided for non-redundant data traffic and ports 11 and 12, which are potentially provided for the redundant data traffic. The user 2 via the port 10 and the port 7 is connected to the user 1. The ports 10 and 7 are connected to each other through the network connection 9.

The user 5 is depicted in FIG. 1 with only port 25, which is provided for non-redundant data traffic. Through the port 25 and the network connection 24, the user 5 is connected to the port 23, and thus the user 1.

In the exemplary communication system depicted in FIG. 1, user 4 has three ports 14, 15, and 22. The ports 14 and 15 are the two ports of the user 4 which may be provided for the redundant data traffic, whereas the port 22 represents a port of the user 4 that is provided for the non-redundant data traffic. Through the port 15 and the network connection 16, the user 4 is connected to the port 8 of the user 1. Furthermore, through the port 14 and the network connection 13, the user 4 is connected to the port 12 of the user 2.

Moreover, in the example depicted in FIG. 1, the user 3 has two ports 19 and 20. The port 20 is provided for the non-redundant data traffic and the port 19 is provided for the redundant traffic. The port 20 connects the user 3 to the port 22 of the user 4 through the network connection 21. The port 19 of the user 3, on the other hand, via the redundant network path 18 with a logic split 17, connects the user 3 to the port 11 of the user 2.

The term "network connection" and the term "network path" are hereinafter used synonymously. A network path with a logic interruption or split, such as the network path 18 with a logic split 17, for example, is hereinafter also referred to as a redundant network path or a redundant path for short. As mentioned above, exactly one pair of ports of each network user, particularly of a switch, are identified as carriers of redundant data traffic. They are also referred to as "R" ports. All other ports of a user are not provided for redundant data traffic and are identified accordingly as "nR" ports for short. The local interface of a switch that is integrated in a device, for example, port 6 of the user 1, is likewise an nR port.

In the exemplary communication system shown in FIG. 1, which is suitable, in particular, for real-time communication, both data messages designated for the redundant forwarding, the so-called "R" messages, and the data messages designated for non-redundant forwarding, the so-called "nR" messages, are transmitted.

Data messages designated for redundant forwarding are, for example, critical, particularly time-critical or real-time critical data messages, which must arrive at a specific instant to a given user, for example, user 3. These critical data messages are injected, for example, through the nR port 6 of the user 1. Of course, any other messages that are considered important or critical may also be designated for redundant forwarding.

For example, these data messages may be respectively identified as critical when they are injected into the communication network 26, e.g. through the nR port 6 of the user 1. Also, by way of an example, a message may be identified as critical in a special header identifier or in any other ways known in the art. The data messages identified as critical may have the characteristic that they ignore the logic splits in a path, e.g. the logic split 17 of a network path 18, and can use these paths despite the logic splits. In contrast, other data messages, which are not designated for redundant forwarding and are therefore not identified accordingly, cannot use a network path with a logic split such as a network path 18 with a logic split 17. That is, the logic split 17 will permit the critical messages to go through to the port 11 but not the other ones.

In the example depicted in FIG. 1, if the network connection 21, for instance, becomes inoperative because of an interruption, the user 3 would be cut off from the rest of the communication system. Through the connection with the user 2 via the redundant network path 18, however, it is possible for data messages designated for redundant forwarding, i.e., the ones identified as critical, to still reach the user 3.

In the depicted example, when data messages are injected into the communication system 26 through the nR port 6 of the user 1, for example, an entry is made in the respective address table 27 of the user 1. That is, if a data message is injected or received which is not designated for redundant forwarding, the respective send address of the data message injected or received is "learned." To "learn" the send address of the injected or received data message, the address of the sender of the received or injected data message and the port of the user through which the respective data message was received or injected, are entered in the address table of the respective receiving user.

For a data message designated for redundant forwarding no such "learning" takes place. For the data message designated for redundant forwarding, only the address of the sender and an additional marking, such as the setting of a filter bit, for example, are entered into the respective address table, for example, address table 27. For an R message, on the other hand, the port of the receiver through which the respective R message was received is not entered.

A necessary condition for the permanent redundant transmission of data messages on disjunctive paths is that circulating data messages can be reliably identified and destroyed. For a reliable identification, the respective send address, also referred to as the MAC source address or the source address for short, must be stored, at the injection point of the data messages that is designated for redundant forwarding, in the address table of the respective injecting user together with an additional marking, such as the set filter bit, for example. A method according to an exemplary, non-limiting embodiment of the present invention for reliably identifying and destroying such circulating data messages will now be described with reference to FIGS. 2, 3, and 4.

Figure 2:
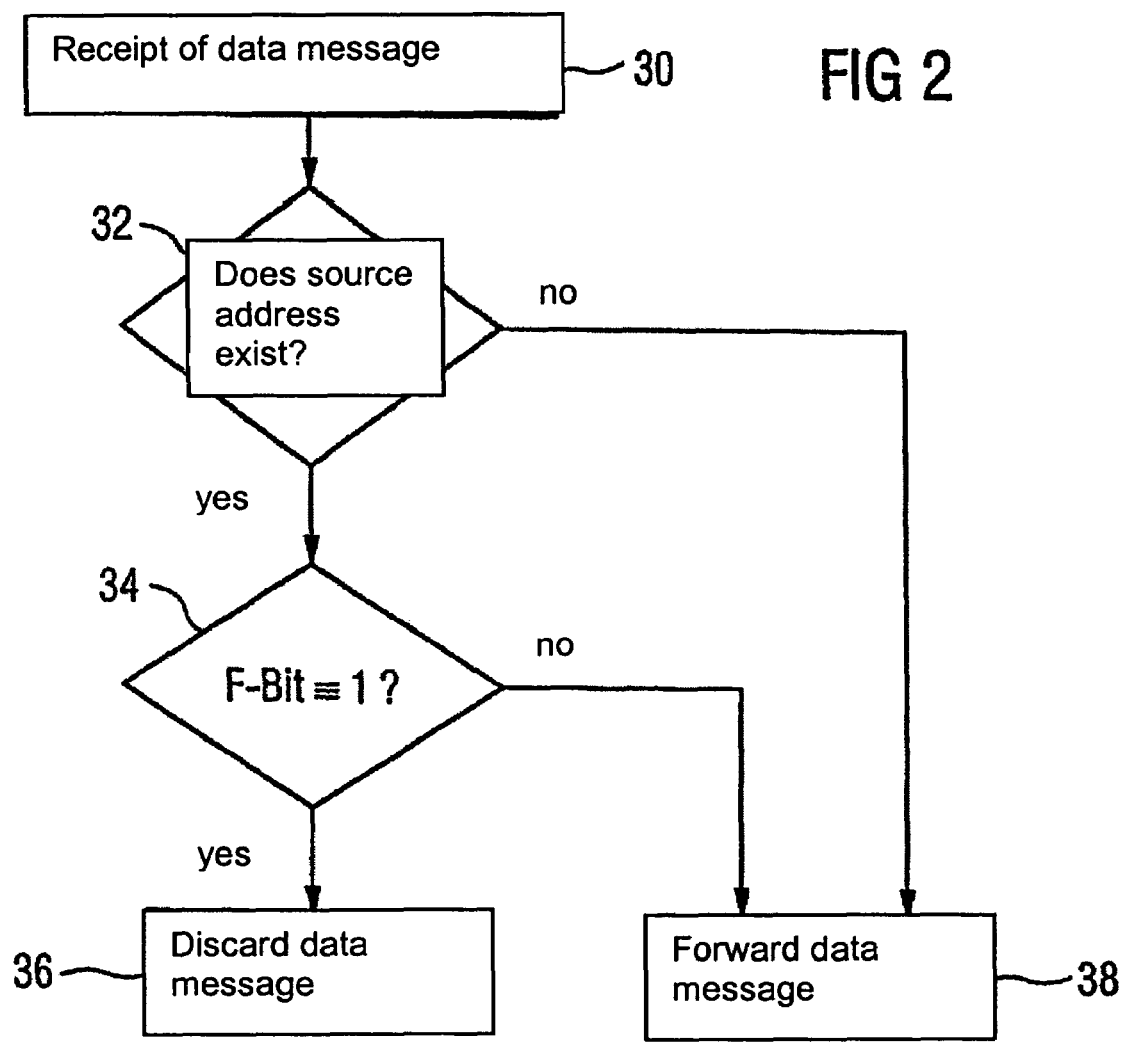
FIG. 2 is a flow diagram of a method for receiving a data message identified as designated for redundant forwarding at a redundant receive port according to an exemplary, non-limiting embodiment of the present invention.

FIG. 2 illustrates the receipt of an R message in a redundant receive port and the subsequent activities, particularly the check for circulation, i.e., the check whether the received R message is a circulating message. As depicted in FIG. 2, step 30 indicates the receipt of an R message at a port of a user, which is in principle designated for redundant data traffic, i.e., at the so-called R port. After the R data message has been received, its source address is used in step 32 to check whether the send address of the received R message has already been entered in the respective address table of the receiving user.

Next, as depicted in FIG. 2, if the source address is found in the respective address table of the receiving user, then at step 34, a check is performed to determine whether the filter bit associated with the valid address entry is set to the value 1, for example. If the filter bit is set to a value 1, for example, the respective R message has previously been received in the respective user. Hence, this respective user is the injection point of the message into the communication system, and the data message is a circulating data message. Therefore, the respective R message is then discarded in step 36.

On the other hand, in the example depicted in FIG. 2, if either the check in step 34 shows that the respective filter bit is not set to the value 1 or the check in step 32 shows that no valid address entry exists for the received R message in the respective address table of the user, then the respective R message is forwarded through the port of the user designated for forwarding and, if applicable, is first duplicated. The duplication process and/or the conditions for duplicating an R message are explained in greater detail further below with reference to FIGS. 5 to 8. The checks according to steps 32 and 34 are performed before the R message has been fully received.

Figure 3:
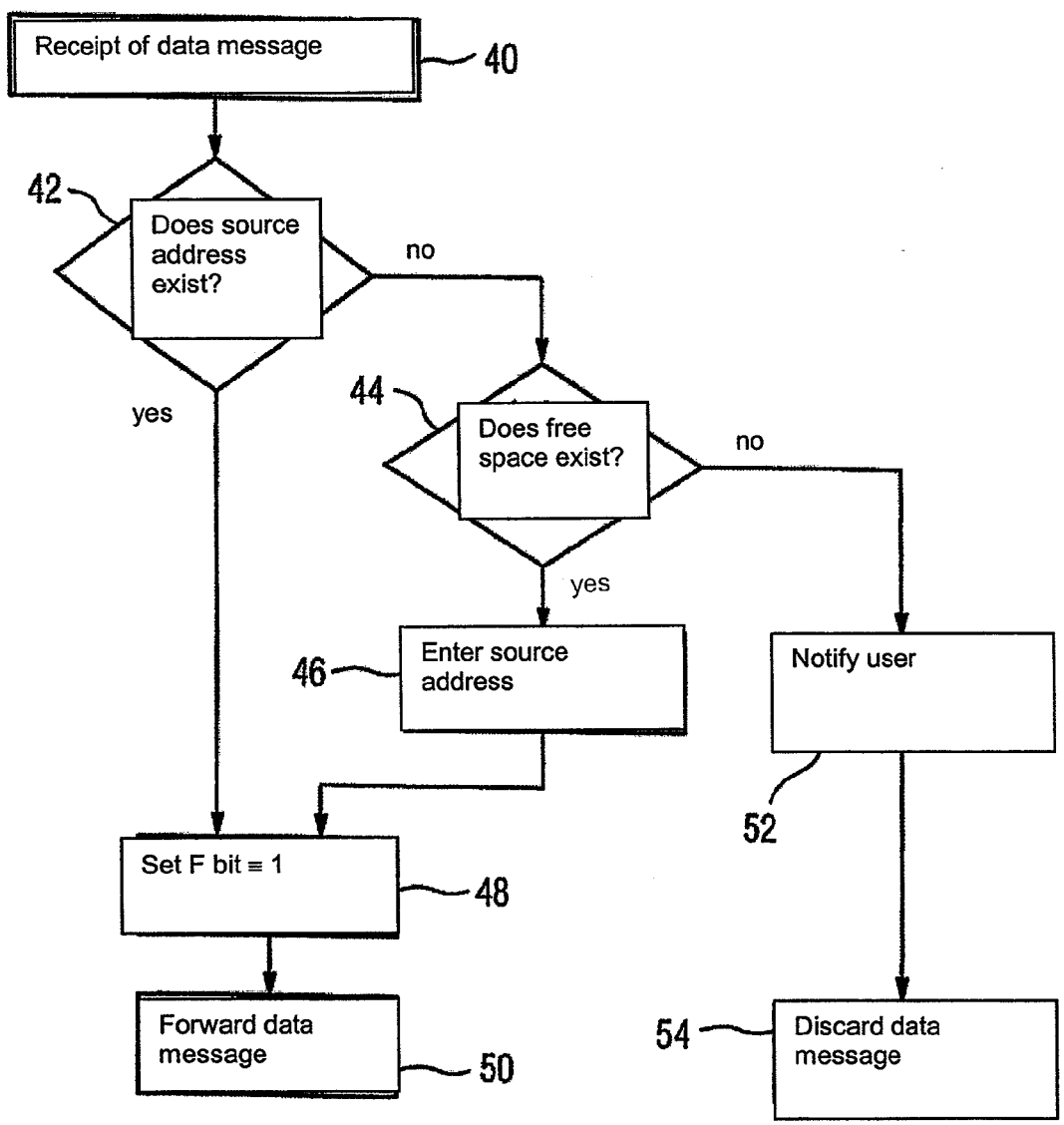
FIG. 3 shows a flow diagram of a method for receiving a data message identified as designated for redundant forwarding at a non-redundant receive port according to the exemplary embodiment of the present invention.

FIG. 3 shows a receipt of an R message at a non-redundant receiving port and the subsequent activities, particularly, the marking of the point of injection of an R message into the communication system. As depicted in FIG. 3, step 40 indicates the receipt of an R message at an additional port of a user, i.e., a port that is not designated for redundant data traffic, a so-called nR port. In step 42, after the receipt of the R message, the source address of the message is first used to check whether the address of the sender of the R message is entered in the respective address table of the user.

As depicted in FIG. 3, if a valid address entry of the send address of this message R is found in the address table, the filter bit, F bit for short, associated with the address entry is set to the value 1 in the address table of the receiving user, in step 48. In step 50, the R message is then forwarded through the port provided for this purpose.

On the other hand, in the flow diagram depicted in FIG. 3, if it is found, in step 42, that no source address has been entered yet for the received R message, in step 44, the receiving user checks whether there is still a free memory location for a new address entry in the address table of this receiving user. If a memory location is available, the address of the sender of the received data message, i.e., the source address, is entered in step 46 and the associated F bit is set to the value 1, in step 48. This identifies the injection point of the R message into the communication system. Thereafter, the received R message is forwarded through the port provided for this purpose, in step 50.

If, on the other hand, the address table includes neither a valid source address, as checked in step 42, nor a free memory location, as checked in step 44, there is an interrupt, and a notification, particularly an error message, is output to the user in step 52. The R message is then discarded in step 54. For example, this may happen if an R message is injected through an nR port. This error should rarely occur. As already explained, the respective R message is not forwarded in this case, and the user is notified by an interrupt. The address table can then be reconfigured to create free memory locations. In case of this error, the respective R message may not be forwarded, because the R message, as a potentially circulating data message, can no longer be unambiguously detected because no source address and no F bit setting can be stored in the address table of the injecting user.

Apart from the above-described case of error, the R message is optionally also duplicated when such an R message is forwarded in the cases described in FIG. 3. The conditions and the sequence for duplicating and forwarding the R message are described in detail, further below with reference to FIGS. 5 to 8.

FIG. 4 shows the receipt of a data message that is not designated for redundant forwarding, i.e., an nR message, at any receive port, an R port or a nR port. Before the steps are carried out after the receipt of the message, however, the nR message must be fully received to ensure that it is not a faulty message (cyclical redundancy check or CRC). Step 60, depicted in FIG. 4, indicates the receipt of such a nR message. In step 62, the receiving user then checks whether the address of the sender of the received nR message exists in the address table and whether the entry is valid, i.e., whether the respective address has already been "learned." If such an entry exists and is valid, the respective entry is optionally updated in step 64. Updating of the respective entry is necessary, for example, if the received nR message was received through a different port than the one entered in the address table. Thereafter, the nR message is forwarded in step 72 through the port of the user provided for such forwarding.

If, on the other hand, in step 62 depicted in FIG. 4, the address table of the receiving user does not yet contain a valid source address, then, in step 66, the receiving user checks whether a free memory location is available in its respective address table. If free memory exists, a new entry is made in the address table in step 68, i.e., the source address of the nR message is "learned." This means that the address of the sender of the received nR message and the port through which the nR message was received are entered in the address table of the user. In addition, in step 70, the filter bit of the respective memory location is set to 0, and the nR message is then forwarded accordingly in step 72. If the address table contains neither a valid entry, as checked in step 62, nor a free memory location, as checked in step 66, the received nR message is forwarded without further actions in step 72.

FIGS. 5, 6, 7, and 8 illustrate possible scenarios when data messages designated for redundant forwarding are transmitted, forwarded or duplicated according to the exemplary, non-limiting embodiment of the present invention.

FIG. 5 shows a user 80 with two ports designated for non-redundant data traffic, for example, port 82 and port 86, and two ports designated for redundant data traffic, port 84 and 88. In FIG. 5, the R message 90 is received, for example, through port 82 and is to be forwarded through port 86. Since both the port through which the R message 90 was received and the port through which the R message is to be forwarded are nR ports, no further action is taken and the R message 90 is forwarded by the user 80.

FIG. 6 shows the same user 80 with the same reference numbers as those used in FIG. 5. The receiving port is again the nR port 82. The port through which the received R message 92 is to be forwarded, however, is the R port 88, which is provided for the forwarding of redundant data traffic. Since the R message 92 is to be forwarded through an R port 88, the received R message 92 is automatically duplicated and additionally forwarded as the R message 94 through the second R port 84, such that the original R message 92 is split into two messages (R message 92 and R message 94). The duplicated R message 94 is an exact copy of and thus is indistinguishable from the original R message 92. This ensures a redundant transmission of the received R message 92.

FIG. 7 shows the same user 80 with the same reference numbers as those used in FIGS. 5 and 6, but in this example, the R message 96 is received through the R port 84. When the R message 96 is received through the R port 84, the received R message 96 is automatically forwarded as the R message 98 through the port 88.

FIG. 8 shows the same user 80 with the same reference numbers as those used already in FIGS. 5, 6, and 7. In this example, the R message 100 is received through the R port 84 and is to be forwarded through the nR port 86. In this example depicted in FIG. 8, the R message 100 is automatically duplicated and additionally forwarded in parallel as R message 102 through the R port 88 of the user 80. In this case, too, the received R message 100 is split for redundant forwarding into R message 100 and R message 102.

FIG. 9 shows an exemplary embodiment of the method according to the present invention. Reference is made to the cyclic communication system 26 and all the identical reference numbers used in FIG. 1. An R message 110, for example, is injected into the communication system 26 through the local interface, the nR port 6 of the user 1. The R message 110 is assigned the cycle number of the current communication cycle, which is a different number from the filter "F" bit. The intended receiver of the R message 110 is the user 3, which is, for example, an automation device, particularly, a control unit.

After the R message 110 has been injected through the nR port 6, a respective entry is generated in the address table 27 of the user 1. This entry consists of the send address of the R message, i.e., the address of the user 1, and the associated F bit set to the value 1. The R message 110 is designated for forwarding through the nR port 7 of the user 1 and is subsequently forwarded to the user 2 through the network connection 9 and the nR port 10. No duplication occurs in the user 1 because both the injecting port and the forwarding port are nR ports.

In the user 2, the R message 110 is to be forwarded through the R port 11. Because the receiving port 10 of the user 2 is an nR port and the forwarding port 11 is an R port, the R message 110 is automatically duplicated. The original R message 110 is forwarded through the R port 11 and the redundant path 18 with the logic split 17 to the R port 19 of the user 3, which is the designated receiver. There, the message is processed accordingly, i.e., the user 3 first stores the cycle number of the current communication cycle, which is stored in the R message 110.

While the R message 110 was forwarded through the R port 11 to the user 3, the duplicate R message 120 was automatically forwarded through the second R port 12 of the user 2 and the network connection 13 to the R port 14 of the user 4. The user 4 forwards the R message 120 through the nR port 22 and the network connection 21 to the nR port 20 of the receiver, the user 3. When the R message 120 is received by the user 3, the user 3 first checks the cycle number of the duplicate R message 120 coming in through the nR port 20. Since the original R message 110 already arrived in user 3 and its data was accepted by the user 3, an updating of the respective data has already taken place in the current communication cycle. In other words, the cycle number stored by the user 3 no longer matches the cycle number of the received duplicate R message 120. The user 3, therefore, destroys the data of the duplicate R message 120, which is, of course, an exact copy of the R message 110.

When the duplicate R message 120 is received in the user 4, the receiving port 14 is an R port and the port 22 designated for forwarding the R message 120 is an nR port. Thus, the R message 120 is again automatically duplicated in parallel, such that the duplicate R message 130 is automatically forwarded through the second R port 15 of the user 4 via the network connection 16 through the R port 8 to the user 1.

When an R message is received through an R port, in this case the R message 130 through the R port 8 of the user 1, the respective address table, in this case the address table 27 of the user 1, is checked to establish whether the send address of the received R message, here R message 130, already exists. In the example depicted in FIG. 9, the R message 130 already exists in the address table 27 of the user 1 because the received R message 130 is a copy of the original R message 110. Furthermore, the filter bit is also set to the value 1 because the R message 110, which was injected into the communication system 26 in the user 1 through the nR port 6. The user 1 can thus unambiguously identify the R message 130 as a circulating data message and destroy the R message 130.

The method according to the exemplary, non-limiting embodiments of the present invention does not require storing and forwarding of the data messages in the switches. Data messages can also be cut through as quickly as possible. To reliably destroy incorrectly circulating data messages, only a single switch within a communication system, particularly a ring-type system, such as communication system 26, for example, needs to work in the store-and-forward mode.

The method according to the exemplary, non-limiting embodiment of the present invention makes possible a permanent redundant transmission of data messages in disjunctive paths, such that circulating data messages can be reliably identified and destroyed. Furthermore, splitting into two data messages in the respective branching points is effected transparently and no additional load is caused for the receiver by the reception of two identical data messages, for example, the assignment of a current cycle number to the received data messages in a cyclic communication system 26. This can also be ensured in a non-cyclic communication system through software processing by using, for example, the header identifier of the data messages. The behavior of the communication system 26 with respect to "learning" the addresses in the individual users 1, 2, 3, 4, and 5, particularly the switches, is not altered for all the remaining, non-redundant data traffic.

The above description of illustrative, non-limiting embodiment and variations thereof has been given by way of an example. The above and other features of the invention including various novel method steps and components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A method for at least one of injecting, receiving, and forwarding data messages in a communication system, having a plurality of users which are interconnected by network paths, in which, each user is configured at least as one of a sender and a receiver of data messages and in which said each user is provided with:
   a unique address,
   at least one first and one second port designated for at least one of receiving and forwarding the data messages designated as non-redundant,
   at least one additional port designated for at least one of injecting, receiving, and forwarding data messages designated for redundant forwarding, and
   an address table for storing at least one send address of an injected data message, and wherein the communication system has at least one network path with a logic interruption,
the method comprising:
   identifying data messages designated for redundant forwarding;
   injecting the data messages designated for redundant forwarding into the communication system at one of the at least one additional port of a user;
   duplicating and determining which ports selected from the first, second, and additional ports are to be used for forwarding one of the data messages designated for redundant forwarding in a user:
      only if the data message is received through the first or the second port and forwarded through an additional port of the user or a data message is received through an additional port and forwarded through the first or the second port of the user;
   additionally forwarding a duplicate data message through the first port of the user if a data message designated for redundant forwarding is received or forwarded through the second port of the user based on the determining, and
   additionally forwarding a duplicate data message through the second port of the user if a data message designated for redundant forwarding is received or forwarded through the first port of the user based on the determining.

2. The method as claimed in claim 1, wherein data messages designated for redundant forwarding are identified by a unique header identifier.

3. The method as claimed in claim 2, wherein:
   if a data message identified as designated for redundant forwarding is received at one of the additional ports of a user, a check is performed to establish whether the address table of the receiving user contains an entry with an additional marking and with the send address of the user that injected the data message into the communication system,
   if the entry is not found in the check, at least one of: the send address of the user which injected the data message into the communication system and an additional marking, is entered into the address table of the receiving user, and the respective data message is then forwarded,
   if the entry is established in the check, the respective data message is forwarded.

4. The method as claimed in claim 2, wherein:
   if at least one of a data message identified as designated for redundant forwarding and a duplicate data message, is received through the first or the second port of a user, a check is performed to find whether the address table of the receiving user contains an entry with the send address of the user which injected the respective data message into the communication system and an additional marking,
   if the entry is found in the performed check, the at least one of respective data message and the duplicate data message are destroyed, and
   if the send address is not found in the performed check or if the send address is found without additional marking in the performed check, the at least one of respective data message and the duplicate data message is forwarded.

5. The method as claimed in claim 2, wherein the communication system operates cyclically.

6. The method as claimed in claim 1, wherein the network path with a logic interruption is used only by the data messages that are identified as designated for redundant forwarding.

7. The method as claimed in claim 1, wherein, if a data message identified as designated for redundant forwarding is injected into the communication system at one of the additional ports of a user, the send address of the user that injects the data message into the communication system and an additional marking are entered into the address table of the injecting user.

8. The method as claimed in claim 7, wherein the additional marking consists of one bit, which can assume one of two values.

9. The method as claimed in claim 1, wherein:
if a data message identified as designated for redundant forwarding is received at one of the additional ports of a user, a check is performed to find whether the address table of the receiving user contains an entry with an additional marking and with the send address of the user that injected the data message into the communication system,
if the entry is not found in the check, at least one of: the send address of the user which injected the data message into the communication system and an additional marking, is entered into the address table of the receiving user, and the respective data message is then forwarded,
if the entry is found in the check, the respective data message is forwarded.

10. The method as claimed in claim 1, wherein:
if at least one of a data message identified as designated for redundant forwarding and a duplicate data message, is received through the first or the second port of a user, a check is performed to find whether the address table of the receiving user contains an entry with the send address of the user which injected the respective data message into the communication system and with an additional marking,
if the entry is found in the performed check, the at least one of respective data message and the duplicate data message are destroyed, and
if the send address is not found in the performed check or if the send address is found without the additional marking in the performed check, the at least one of respective data message and the duplicate data message are forwarded.

11. The method as claimed in claim 1, wherein the communication system operates cyclically.

12. The method as claimed in claim 11, wherein a data message identified as designated for redundant forwarding is assigned a current cycle number when it is injected into the communication system.

13. The method as claimed in claim 12, wherein the receiver of a data message identified as designated for redundant forwarding stores the current cycle number of the received data message.

14. The method as claimed in claim 12, wherein, if the receiver of a data message identified as designated for redundant forwarding receives the data message, then the receiver compares the cycle number of the received data message with the current cycle number stored in the receiver, and the receiver accepts the data of the received data message if the two compared cycle numbers match and if the two compared cycle numbers do not match, the receiver performs at least one of ignoring the data of the received data message and destroying the data message.

15. The method as claimed in claim 11, wherein the receiver of a data message identified as designated for redundant forwarding stores the current cycle number of the received data message.

16. The method as claimed in claim 11, wherein, if the receiver of a data message identified as designated for redundant forwarding receives the data message, then the receiver compares the cycle number of the received data message with the current cycle number stored in the receiver, and the receiver accepts the data of the received data message if the two compared cycle numbers match and if the two compared cycle numbers do not match, the receiver performs at least one of ignoring the data of the received data message and destroying the data message.

17. The method as claimed in claim 1, wherein the communication system is for real-time communication.

18. A user for a communication system, configured as at least one of a sender and a receiver of data messages, the user being provided with:
a unique address,
at least one first and one second port designated for performing at least one of receiving and forwarding data messages designated as non-redundant,
at least one additional port designated for performing at least one of injecting, receiving, and forwarding data messages designated for redundant forwarding, and
an address table storing at least one send address of an injected data message,
the user comprising:
a module identifying data messages designated for redundant forwarding,
a module injecting the data messages designated redundant forwarding into the communication system at one of the additional ports,
a module duplicating and determining which ports selected from the first, second, and additional ports are to be used for forwarding one of the data messages designated redundant forwarding only if a data message is received through the first or the second port and forwarded through an additional port, or the data message is received through an additional port and forwarded through the first or the second port,
a module additionally forwarding a duplicate data message through the first port if a data message designated for redundant forwarding is received or forwarded through the second port based on the determining by the duplicating and determining module, and
a module additionally forwarding a duplicate data message through the second port if a data message designated for redundant forwarding is received or forwarded through the first port based on the determining by the duplicating and determining module.

19. The user as claimed in claim 18, wherein the user identifies the data messages designated for redundant forwarding by a unique header identifier.

20. The user as claimed in claim 18, wherein, when injecting a data message identified as designated for redundant forwarding into the communication system at one of the additional ports, the user enters the send address of the injecting user and an additional marking in the address table of the injecting user.

21. The user as claimed in claim 18, wherein:
when receiving a data message identified as designated for redundant forwarding at one of the additional ports, the user checks whether the address table of the receiving user contains an entry with the send address of the user that injected the data message into the communication system and an additional marking, if no entry is found in the check, the receiving user enters at least one of the send address of the user which injected the data message into the communication system and an additional marking in the address table, and the receiving user forwards the respective data message, and if the entry is found in the check, the receiving user forwards the data message.

22. The user as claimed in claim 18, wherein:

when receiving at least one of a data message identified as designated for redundant forwarding and a duplicate message through the first or the second port, the user checks whether the address table of the receiving user contains an entry with the send address of the user that injected the respective data message into the communication system and an additional marking, if an entry is found in the check, the receiving user destroys the at least one of respective data message and respective duplicate data message, if at least one of the send address and the additional marking is not found during the check, the receiving user forwards the at least one respective data message and respective duplicate data message.

23. The user as claimed in claim 18, wherein the user is a user of a communication system and wherein the communication system works cyclically.

24. The user as claimed in claim 23, wherein when injecting a data message identified as designated for redundant forwarding into the communication system, the user assigns the injected data message designated for redundant forwarding a current cycle number.

25. The user as claimed in claim 24, wherein the user which is the receiver of a data message identified as designated for redundant forwarding stores the current cycle number of the received data message.

26. A user as claimed in claim 24, wherein:

the user which is the receiver of a data message identified as designated for redundant forwarding, when receiving the data message, compares the cycle number of the received data message with the cycle number stored in the receiver, wherein the receiver accepts the data of the received data message if the two compared cycle numbers match, the receiver performs at least one of ignoring the data of the received data message and destroying the data message if the two compared cycle numbers do not match.

27. The user as claimed in claim 23, wherein the user which is the receiver of a data message identified as designated for redundant forwarding stores the current cycle number of the received data message.

28. A user as claimed in claim 27, wherein:

the user which is the receiver of a data message identified as designated for redundant forwarding, when receiving the data message, compares the cycle number of the received data message with the cycle number stored in the receiver, wherein the receiver accepts the data of the received data message if the two compared cycle numbers match, the receiver performs at least one of ignoring the data of the received data message and destroying the data message if the two compared cycle numbers do not match.

29. A user as claimed in claim 23, wherein:

the user which is the receiver of a data message identified as designated for redundant forwarding, when receiving the data message, compares the cycle number of the received data message with the cycle number stored in the receiver, wherein the receiver accepts the data of the received data message if the two compared cycle numbers match, the receiver performs at least one of ignoring the data of the received data message and destroying the data message if the two compared cycle numbers do not match.

30. The user as claimed in claim 18, wherein the user is a network node with an integrated coupling unit.

31. The user as claimed in claim 30, wherein the integrated coupling unit is a real-time ethernet switch.

32. The user as claimed in claim 18, wherein the user is an automation device.

33. A communication system having a plurality of users as claimed in claim 18.

34. The communication system as claimed in claim 33, wherein the communication system has at least one network path with a logic interruption, and wherein the network path with a logic interruption is used only by the data messages identified as designated for redundant forwarding.

35. The communication system as claimed in claim 33, wherein the communication system is an ethernet-type or a real-time ethernet type switched communication system.

36. The communication system as claimed in claim 33, wherein the communication system is an automation system.

37. The user as claimed in claim 18, wherein the communication system is a real-time communication system.

38. The method as claimed in claim 1, wherein the first and second ports are a first type of port that is designated for non-redundant data traffic and wherein the at least one additional port is a second type of port that is designated for redundant data traffic.

39. The method as claimed in claim 38, wherein:

the at least one additional port comprises a first additional port and a second additional port, when the data message designated for the redundant forwarding is received via the first additional port and is forwarded via the second additional port, the data message designated for the redundant forwarding is not duplicated and not additionally forwarded, and when the data message designated for the redundant forwarding is received via the first port and is forwarded via the second port, the data message designated for the redundant forwarding is not duplicated and not additionally forwarded.

40. The method as claimed in claim 39, wherein:

when the data message designated for the redundant forwarding is received through the first or the second port and forwarded through one of the additional ports, the data message designated for the redundant forwarding is duplicated and the other additional port is determined as the selected port for the additional forwarding, and when the data message designated for the redundant forwarding is received through one of the additional ports and forwarded through the first port or the second port, the data message designated for the redundant forwarding is duplicated and the other additional port is determined as the selected port for the additional forwarding.

* * * * *